United States Patent Office 3,308,931
Patented Mar. 14, 1967

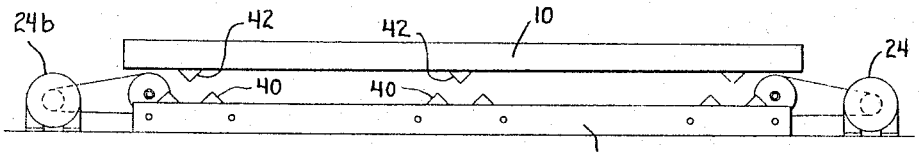
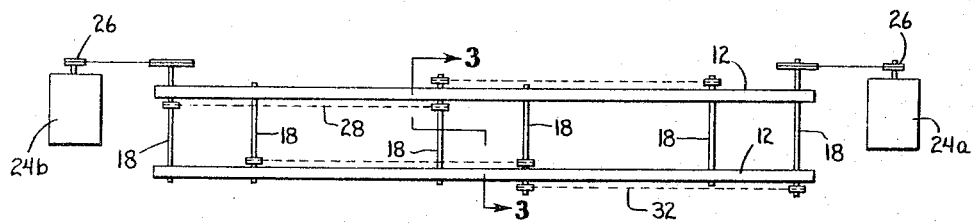
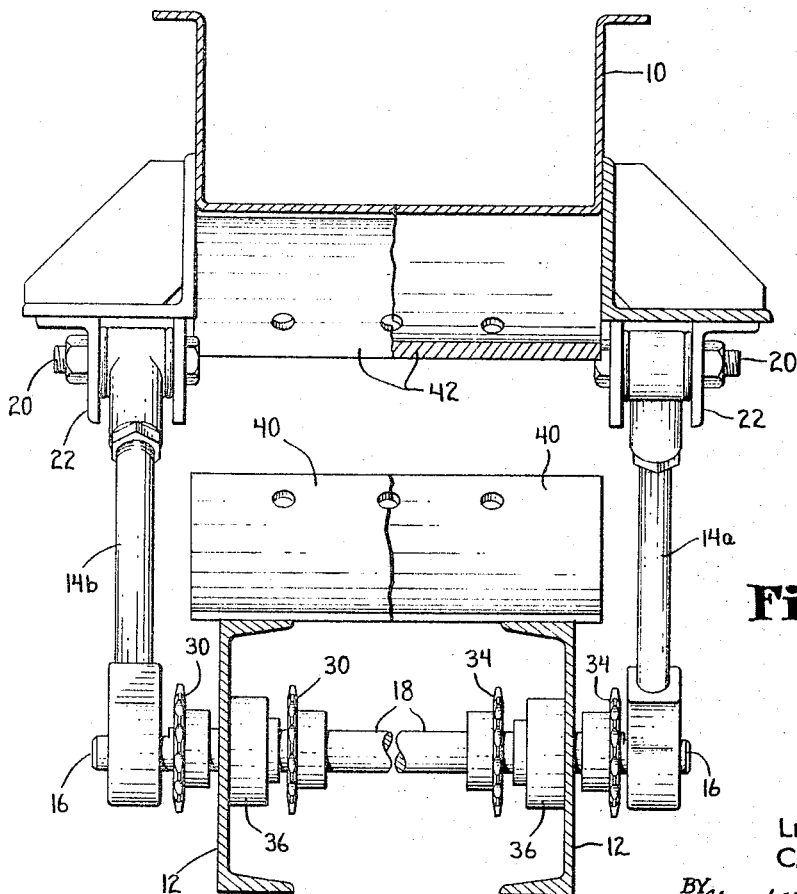

3,308,931
VIBRATORY CONVEYOR
Leo F. Bedan and Carroll L. Bedan, both of Rte. 1,
Floyds Knobs, Ind. 47119
Filed Aug. 5, 1965, Ser. No. 477,437
7 Claims. (Cl. 198—220)

This invention relates to vibratory conveyors; and concepts of the invention provide a reversible conveyor of novel and advantageous construction. Drive links of one travel-direction type serve as stabilizers when drive is actuated in the other direction; and springs are provided whose natural resonant frequency is utilized to advantage in the combination.

Specific concepts, details and advantages of the invention are more fully described in the following detailed description of an illustrative embodiment of the invention, reference being had to the accompanying somewhat schematic and diagrammatic drawings, in which:

FIG. 1 is a side view of a vibrator conveyor installation according to the invention, certain components being removed;

FIG. 2 is a plan view thereof, particularly illustrating the drive means, and with certain other components removed;

FIG. 3 is a cross-sectional view of the installation, taken generally along view-line indicator 3—3 of FIG. 2; the springs being omitted.

Figure 4:
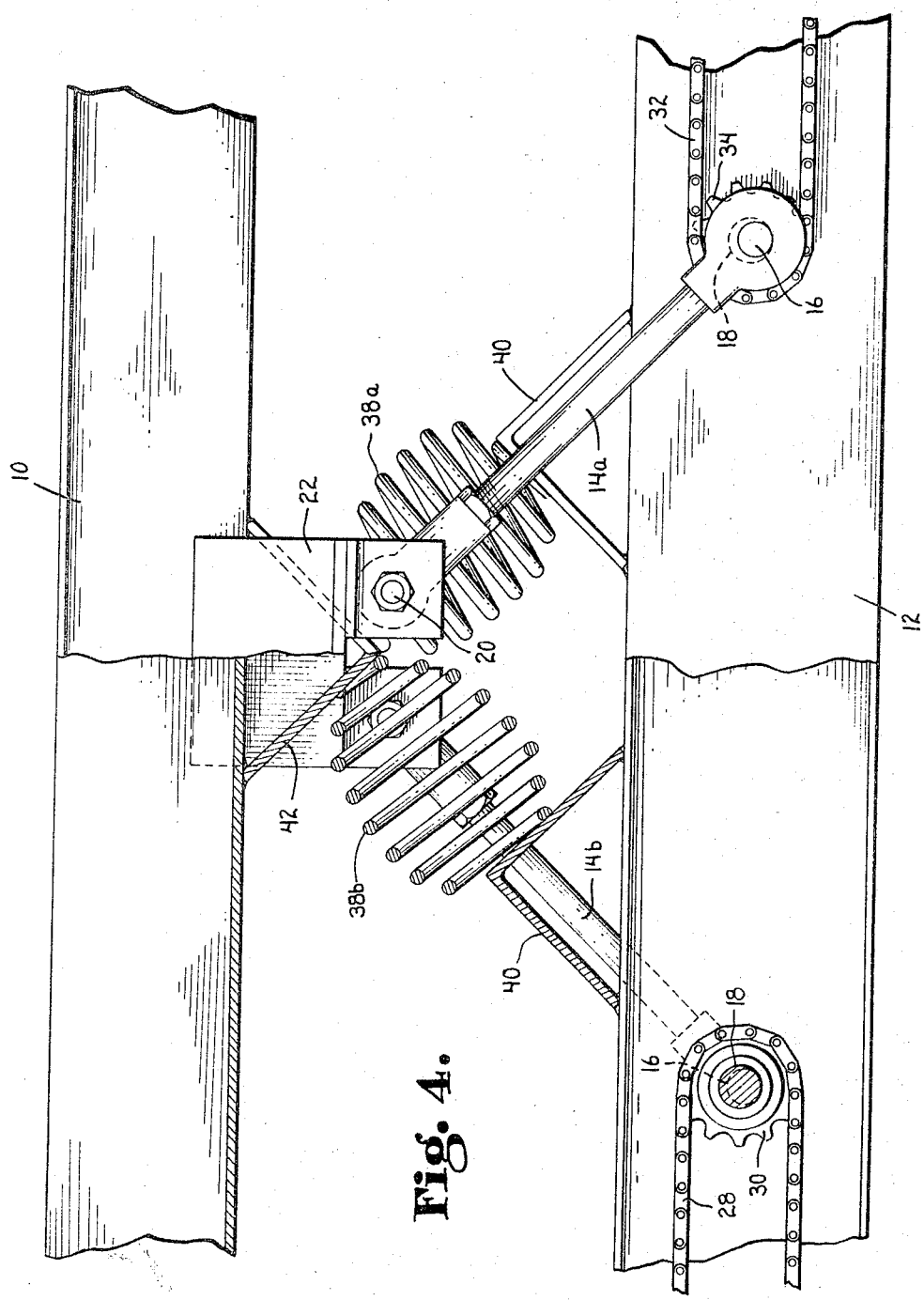
FIG. 4 is a partial side view of the installation, including the springs.

As shown in the drawings, a vibrator conveyor comprises the general components of a conveyor trough 10 supported by a base formed by a pair of longitudinally extending channel members 12; and, by reversible drive means yet to be described in detail, the trough 10 is caused to move or vibrate in diagonally-directed oscillations or impulses, the direction of the impulses being selectable to cause material being conveyed in the trough 10 to travel in whichever direction is desired.

Operatively interconnecting the trough 10 and the base-frames 12 are a series of links 14 spaced along the length of the conveyor. Each link 14 is pivotally connected at its lower end to a crank arm formed by an eccentrically-cut portion 16 of a drive shaft 18, and at its upper end, each link 14 is pivotally connected, as by a pin 20, to a bracket 22 secured to the trough 10.

The links 14 comprise two sets of links, respectively identified as 14a and 14b as are now described. In the embodiment shown, the links 14a on the near side of the installation (which is the right-hand side in FIG. 3) extend from the trough 10 downwardly to the right; and these links impart leftward material travel. And links 14b on the far side extend from the trough 10 downwardly to the left, for imparting rightward material travel.

Drive of the shafts 18 is by a pair of motors 24. The motor 24b, shown at the left in FIGS. 1 and 2, drives (through a speed-varying variable-pitch sheave 26) the rightward-travel links 14b, through a chain drive 28 which engages a sprocket 30 on each drive shaft 18 which carries those rightward-travel links 14b. Similarly, the motor 26 at the right in FIGS. 1 and 2 drives (through a speed-varying variable-pitch sheave 26) the leftward-travel links 14a, through a chain drive 32 which engages a sprocket 34 on each drive shaft 18 which carries those leftward-travel links 14a.

The sprockets 30 and 34, respectively, are double on all shafts 18 except for the shafts at the beginning and end of each drive train, one of the double sprockets serving to receive drive power for the link on that shaft, and the other serving to transmit the drive power to the next shaft having a link of the same type. Shaft bearings are indicated at 36.

Compression springs 38 are also provided, and in the embodiment shown, the springs 38 include springs 38a disposed parallel to links 14a, and springs 38b disposed parallel to links 14b. The spring ends seat, at their bottom, on a bracket 40 shown of inverted V-shape secured to base-frames 12, and at their top, on a bracket 42 shown of V-shape secured to the trough 10. As shown, a single bracket 42 serves to bottom the top end of adjacent springs 38a and 38b. At each spring location along the conveyor there are desirably three springs 38 provided, the three springs 38a and three springs 38b being respectively superimposed in the showing of FIG. 4.

In operation, assuming material-travel is desired to be in a leftward direction, motor 24a is actuated. This, through chain drive system 32, drives all shafts 18 having left-drive links 14a. The eccentricity of shaft-portions 16 cause the links 14a to reciprocate, thus moving the trough 10 in an upwardly-left and downwardly-right oscillating vibratory motion, effecting a leftward impulsing travel of material in the trough 10. Power requirements are smoothed by the springs 38a which are compressed on the downstroke, the release of this compression on the upstroke reducing power required for the upstroke. Desirably, the machine speed is adjusted to the speed at which the springs 38a will oscillate at their natural resonant frequency.

Continuing the description of leftward-movement drive means, the above-mentioned vibration of the trough 10 is accommodated by the links 14b rocking slightly about their pivotal connection on the eccentrics 16; and is accommodated by the spring 38b rocking laterally on their axes. These links 14b, during leftward material-travel actuation, serve as stabilizers.

If rightward material-travel, is desired, motor 24a is stopped and motor 24b is actuated, thus driving chain drive system 28 and thus the several links 14b, achieving an upwardly-right and downwardly-left oscillation or vibration of the trough 10. Springs 38b smooth out the power requirements; and links 14a serve as the stabilizers.

It will be seen that a vibratory conveyor according to the present inventive concepts achieves several advantages, including: The overall length can be quite large, there being a multiplicity of drive links simultaneously operating from and delivering oscillating strokes at spaced points along the conveyor length; Full reversibility of material travel is provided, with only one of the drive motors running at any time; Reversibility is quite convenient and rapid, requiring only a switching of one motor to an "off" position and the other motor to an "on" position; Speed variation as desired; No requirement of high starting torque motors.

Thus, the present invention accomplishes its intended object, including those hereinbefore pointed out and others that are inherent in the invention.

It will be understood that modifications and variations may be effected without departing from the scope of the novel concepts of the present invention. Accordingly, the invention is not to be considered limited to the specific form or arrangements herein described and shown.

What is claimed is:
1. A vibratory conveyor, comprising:
   a longitudinally-extending material-supporting member;
   a base;
   a series of rightward-travel drive links at spaced points along the conveyor, each operatively pivotally connected to the material-supporting member;
   rightward-travel drive means supported by the base for driving said right-ward-travel drive links;
   a series of leftward-travel drive links at spaced points along the conveyor, each operatively pivotally connected to the material-supporting member;

leftward-travel drive means supported by the base for driving said leftward-travel drive links.

2. A vibratory conveyor, comprising:
a longitudinally-extending material-supporting member;
a base;
a series of rightward-travel drive links at spaced points along the conveyor, each operatively pivotally connected to the material-supporting member;
rightward-travel drive means supported by the base for driving said rightward-travel drive links;
a series of leftward-travel drive links at spaced points along the conveyor, each operatively pivotally connected to the material-supporting member;
leftward-travel drive means supported by the base for driving said leftward-travel drive links;
each of the rightward-travel drive means and the leftward-travel drive means being interconnected by a power means for driving each of said drive means in unison.

3. A vibratory conveyor, comprising:
a longitudinally-extending material-supporting member;
a base;
a series of rightward-travel drive links at spaced points along the conveyor, each operatively pivotally connected to the material-supporting member;
rightward-travel drive means supported by the base for driving said rightward-travel drive links;
a series of leftward-travel drive links at spaced points along the conveyor, each operatively pivotally connected to the material-supporting member;
leftward-travel drive means supported by the base for driving said leftward-travel drive links;
a series of compression springs for the rightward-travel drive and a series of compression springs for the leftward-travel drive, smoothing out power requirements, being operatively bottomed between the material-supporting member and the base.

4. A vibratory conveyor, comprising:
a longitudinally-extending material-supporting member;
a base;
a series of rightward-travel drive links at spaced points along the conveyor, each operatively pivotally connected to the material-supporting member;
rightward-travel drive means supported by the base for driving said rightward-travel drive links;
a series of leftward-travel drive links at spaced points along the conveyor, each operatively pivotally connected to the material-supporting member; leftward-travel drive means supported by the base for driving said leftward-travel drive links;
a series of compression springs for the rightward-travel drive and a series of compression springs for the leftward-travel drive, smoothing out power requirements, being operatively bottomed between the material-supporting member and the base;
an abutment means carried by the material-supporting member and serving to bottom the top of the adjacent springs of both types.

5. A vibratory conveyor including a material-supporting member, a plurality of drive links which support the said member and positively drive the said member in impulses in either direction, to obtain material-movement in either direction, and having variable-speed means for actuating links.

6. A vibratory conveyor including a material-supporting member, a plurality of drive links which support the said member and positively drive the said member in impulses in either direction to obtain material-movement in either direction, the drive links being at spaced points along the conveyor to equalize the vibratory drive thereof, and means for actuating said drive links.

7. A vibratory conveyor including a material-supporting member, a frame, a plurality of drive links which support the said member and positively drive the said member in impulses in either direction to obtain material-movement in either direction, and compression springs operatively connected to the material-supporting member and a frame member for smoothing out power requirements, means to regulate the springs and the drive of said drive links so that the springs oscillate at their natural resonant frequency, and means for actuating said drive links.

References Cited by the Examiner

UNITED STATES PATENTS

| | | | |
|---|---|---|---|
| 3,080,961 | 3/1963 | Allen | 198—220 |
| 3,176,834 | 4/1965 | Allen | 198—220 |

EVON C. BLUNK, *Primary Examiner.*

RICHARD E. AEGERTER, *Examiner.*